United States Patent
Sugie et al.

(10) Patent No.: US 9,463,520 B2
(45) Date of Patent: Oct. 11, 2016

(54) WIRE ELECTRIC DISCHARGE MACHINING APPARATUS AND CONTROL DEVICE

(71) Applicants: Hiroshi Sugie, Chiyoda-ku (JP); Hiroyuki Takeda, Chiyoda-ku (JP); Takayuki Nakagawa, Chiyoda-ku (JP)

(72) Inventors: Hiroshi Sugie, Chiyoda-ku (JP); Hiroyuki Takeda, Chiyoda-ku (JP); Takayuki Nakagawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 391 days.

(21) Appl. No.: 13/979,928

(22) PCT Filed: Oct. 30, 2012

(86) PCT No.: PCT/JP2012/078067
§ 371 (c)(1),
(2) Date: Jul. 16, 2013

(87) PCT Pub. No.: WO2014/068681
PCT Pub. Date: May 8, 2014

(65) Prior Publication Data
US 2014/0116991 A1    May 1, 2014

(51) Int. Cl.
*B23H 7/10* (2006.01)
*B23H 7/06* (2006.01)

(52) U.S. Cl.
CPC ............... *B23H 7/065* (2013.01); *B23H 7/10* (2013.01); *B23H 7/105* (2013.01)

(58) Field of Classification Search
CPC ............ B23K 1/00; B23K 7/00; B23K 7/06; B23K 7/08; B23K 7/10; B23K 7/20; B23K 7/26; B23K 7/32; B23K 7/101
See application file for complete search history.

(56) References Cited

U.S. PATENT DOCUMENTS

| | | | | |
|---|---|---|---|---|
| 4,703,143 A | * | 10/1987 | Okubo et al. | 219/69.12 |
| 4,885,449 A | | 12/1989 | Suzuki et al. | |
| 2004/0238498 A1 | | 12/2004 | Okuda et al. | |
| 2009/0143891 A1 | * | 6/2009 | Lin et al. | 700/110 |

FOREIGN PATENT DOCUMENTS

| | | |
|---|---|---|
| JP | 2-160424 A | 6/1990 |
| JP | 3-55127 A | 3/1991 |

(Continued)

OTHER PUBLICATIONS

International Search Report for PCT/JP2012/078067 dated Jan. 22, 2013.

*Primary Examiner* — Brian Jennison
(74) *Attorney, Agent, or Firm* — Sughrue Mion, PLLC

(57) ABSTRACT

The present invention includes drive units 7a and 7b that change a relative position between a wire electrode 12 and a workpiece 14 by moving a position of wire guide 8a and 8b, drive control units 6a and 6b that drive the drive units 7a and 7b based on a machining shape on the workpiece 14, respectively, a correction-amount storage unit 3 that previously stores therein a position correction amount for the wire electrode 12 corresponding to a machining condition, a correction-amount reading unit 4 that reads the position correction amount corresponding to the machining condition from the correction-amount storage unit 3, and a wire-position correction unit 5 that causes the drive control units 6a and 6b to correct a relative distance between the wire electrode 12 and the workpiece 14 based on the read position correction amount.

9 Claims, 8 Drawing Sheets

(56) References Cited

FOREIGN PATENT DOCUMENTS

| JP | 8-52621 A | 2/1996 |
|----|-----------|--------|
| JP | 10-263933 A | 10/1998 |
| JP | 2004-351571 A | 12/2004 |
| JP | 2006-239807 A | 9/2006 |
| JP | 2009-136999 A | 6/2009 |
| WO | 88/03074 A1 | 5/1988 |

* cited by examiner

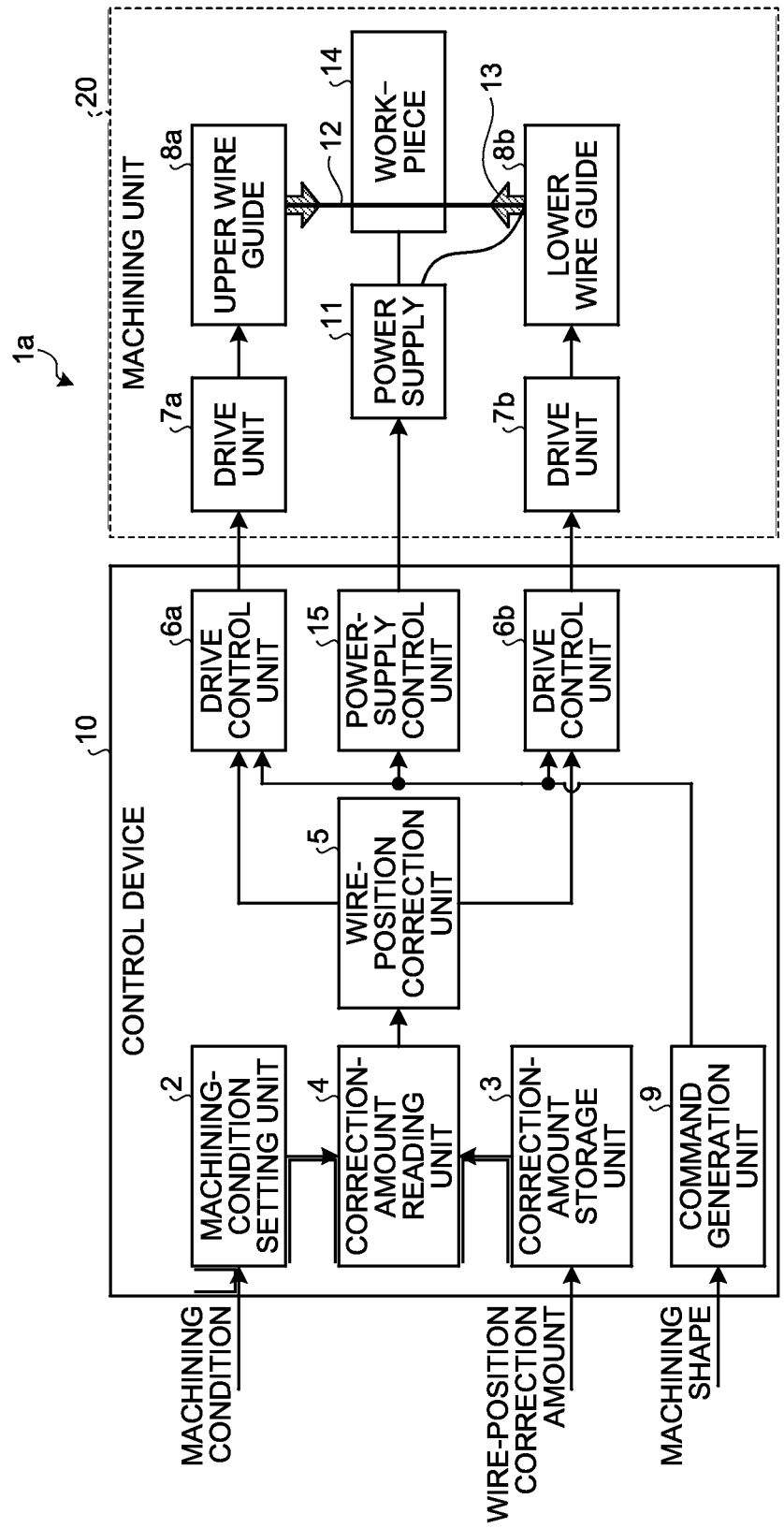

| MACHINING CONDITION | (1) | (2) | (3) | (4) |
|---|---|---|---|---|
| WIRE TENSION | 10 | 10 | 8 | 8 |
| MACHINING FLUID PRESSURE | 4 | 2 | 4 | 2 |
| WIRE-POSITION CORRECTION AMOUNT | +2 | 0 | -3 | +1.5 |

WIRE ELECTRIC DISCHARGE MACHINING APPARATUS AND CONTROL DEVICE

CROSS REFERENCE TO RELATED APPLICATIONS

This application is a National Stage of International Application No. PCT/JP2012/078067 filed Oct. 30, 2012, the contents of which are incorporated herein by reference in their entirety.

FIELD

The present invention relates to a wire electric discharge machining apparatus and a control device that reduce a machining contour error by correcting displacement in the position of a wire electrode.

BACKGROUND

When a conventional wire electric discharge machining apparatus machines a workpiece using a wire, a wire guide having a nozzle delivers a machining fluid to the wire. This wire electric discharge machining apparatus detects an amount of displacement of the wire caused by a pressure of the machining fluid and determines a position correction amount of the wire based on the detected displacement amount. The wire electric discharge machining apparatus then corrects a relative position between the workpiece and the wire by using the position correction amount, thereby correcting a machining contour error (see, for example, Patent Literature 1).

CITATION LIST

Patent Literature

Patent Literature 1: Japanese Patent Application Laid-open No. 2-160424

SUMMARY

Technical Problem

In the conventional technique, however, since position displacement of the wire caused by elastic deformation of the wire guide dependent on a wire tension is not considered, the machining contour error cannot be corrected with high accuracy. When wire tensions differ, for example, between during rough machining and during finish machining, machining removal amounts during the finish machining vary according to machining directions due to a machining contour error during the rough machining. Therefore, on a machining surface where the machining removal amount is large, a machining speed is reduced and machining surface accuracy is decreased.

The present invention has been achieved in view of these problems, and an object of the present invention is to provide a wire electric discharge machining apparatus and a control device that can perform highly accurate position error correction of a wire electrode.

Solution to Problem

The present invention is directed to a wire electric discharge machining apparatus that achieves the object. The wire electric discharge machining apparatus includes a first wire guide that supports a wire electrode at a first position and delivers the wire electrode to a side of a workpiece; a second wire guide that supports the wire electrode at a second position opposing the first position and rewinds the wire electrode delivered from the side of the workpiece; a first drive unit that changes a relative position between the wire electrode and the workpiece by moving a position of the first wire guide; a second drive unit that changes a relative position between the wire electrode and the workpiece by moving a position of the second wire guide; a first drive control unit that controls the first drive unit based on a machining shape of a portion of the workpiece to be machined; a second drive control unit that controls the second drive unit based on the machining shape; a machining-condition setting unit that sets a machining condition including a tension of the wire electrode extended between the first wire guide and the second wire guide; a correction-amount storage unit that previously stores therein a position correction amount for the wire electrode corresponding to the machining condition; a correction-amount reading unit that reads the position correction amount for the wire electrode corresponding to the machining condition from the correction-amount storage unit; and a wire-position correction unit that causes the first and second drive control units to correct a relative distance between the wire electrode and the workpiece based on the position correction amount.

Advantageous Effects of Invention

According to the present invention, highly accurate position error correction of a wire electrode can be performed.

BRIEF DESCRIPTION OF DRAWINGS

FIG. 1 depicts a configuration of a wire electric discharge machining apparatus according to a first embodiment.

FIG. 8-1 is an example of results of machining shape measurement of a workpiece.

FIG. 8-2 is an example of wire-position correction amounts for respective machining conditions.

DESCRIPTION OF EMBODIMENTS

Exemplary embodiments of a wire electric discharge machining apparatus according to the present invention will be explained below in detail with reference to the accompanying drawings. The present invention is not limited to the embodiments.

First Embodiment

Figures 1, 2, 8:
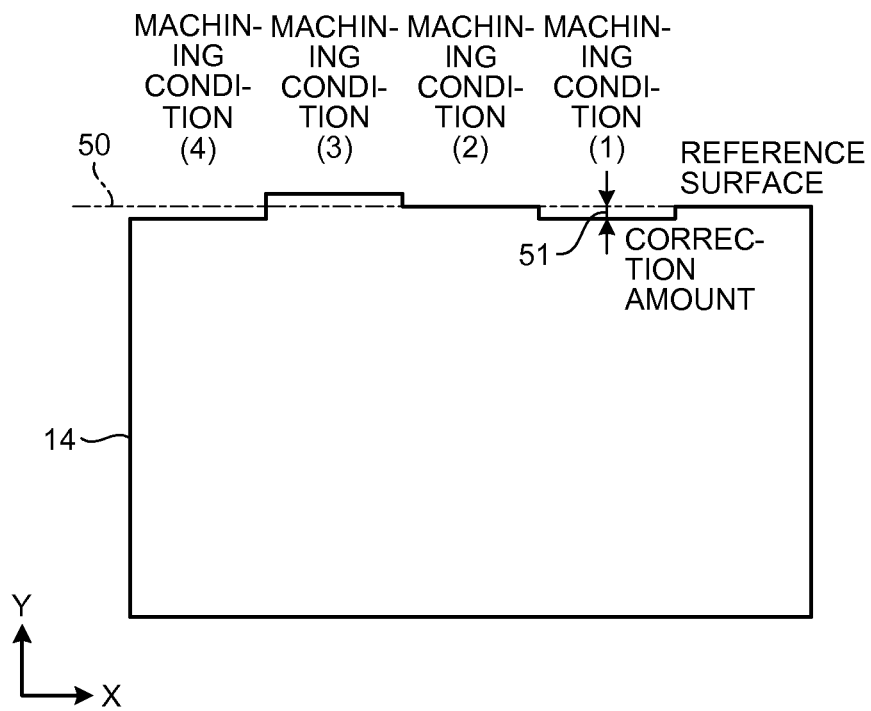

FIG. 1 depicts a configuration of a wire electric discharge machining apparatus according to a first embodiment of the present invention. A wire electric discharge machining apparatus 1a performs electric discharge machining of a workpiece 14, by applying a voltage between a wire electrode 12 and the workpiece 14. The wire electric discharge machining apparatus 1a according to the present embodiment corrects a relative position between the workpiece 14 and the wire electrode 12, by considering position displacement of the wire electrode 12 caused by elastic deformation of wire guides (an upper wire guide 8a and a lower wire guide 8b) depending on a wire tension.

The wire electric discharge machining apparatus 1a includes a control device 10 and a machining unit 20. The control device 10 includes a machining-condition setting unit 2, a correction-amount storage unit 3, a correction-amount reading unit 4, a wire-position correction unit 5, drive control units 6a and 6b, a command generation unit 9, and a power-supply control unit 15. The machining unit 20 includes drive units 7a and 7b, the upper wire guide 8a, the lower wire guide 8b, a power supply 11, and the wire electrode 12.

In the machining unit 20, the upper wire guide 8a is placed on the upper side of a position where the workpiece 14 is machined, and the lower wire guide 8b is placed on the lower side thereof. In other words, the upper wire guide 8a and the lower wire guide 8b are located to sandwich the workpiece 14 therebetween in the vertical direction.

The upper wire guide 8a supports the wire electrode 12 from the upper side and delivers the wire electrode 12 to the lower side. The lower wire guide 8b supports the wire electrode 12 from the lower side and rewinds the wire electrode 12. In this way, the wire electrode 12 is extended between the upper wire guide 8a and the lower wire guide 8b. The wire electrode 12 is fed in a fixed direction from the upper wire guide 8a to the lower wire guide 8b.

The power supply 11 is connected to the wire electrode 12 and the workpiece 14. A pulsed voltage is applied between the wire electrode 12 and the workpiece 14 by the power supply 11, and the workpiece 14 is machined in a jigsaw shape by electric discharge resulted from this voltage application.

A machining fluid 13 is supplied along the wire electrode 12 from nozzles (nozzles 30a and 30b explained later) installed on the upper wire guide 8a and the lower wire guide 8b. This machining fluid 13 is supplied, for example, to maintain an insulating state between the wire electrode 12 and the workpiece 14, to eliminate a machining removal portion generated by machining of the workpiece 14, and to cool the workpiece 14 and the wire electrode 12.

The drive unit 7a drives the upper wire guide 8a and the drive unit 7b drives the lower wire guide 8b. The drive unit 7a moves, for example, the position of the upper wire guide 8a in a plane perpendicular to the wire electrode 12. The drive unit 7b moves, for example, the position of the lower wire guide 8b in a plane perpendicular to the wire electrode 12. The drive units 7a and 7b and the power supply 11 are controlled by the control device 10.

A machining shape is input to the command generation unit 9 of the control device 10 from an external device (not shown) or the like. The command generation unit 9 generates commands for the drive control units 6a and 6b and the power-supply control unit 15, based on the input machining shape. The machining shape to be input to the command generation unit 9 is a shape of a part of the workpiece 14 to which machining is performed. The machining shape can be a post-machining shape of the workpiece 14 to be formed by machining of the workpiece 14.

A command (an upper-portion drive command) generated by the command generation unit 9 for the drive control unit 6a is a command for the drive control unit 6a to control the drive unit 7a and is a command for the drive unit 7a to drive the upper wire guide 8a.

A command (a lower-portion drive command) generated by the command generation unit 9 for the drive control unit 6b is a command for the drive control unit 6b to control the drive unit 7b and is a command for the drive unit 7b to drive the lower wire guide 8b.

A command (a power supply command) generated by the command generation unit 9 for the power-supply control unit 15 is a command for the power-supply control unit 15 to control the power supply 11 and is a command for the power supply 11 to control the voltage applied between the wire electrode 12 and the workpiece 14.

The drive control unit 6a controls the drive unit 7a based on the upper-portion drive command. The drive control unit 6b controls the drive unit 7b based on the lower-portion drive command. The power-supply control unit 15 controls the power supply 11 based on the power supply command. With the controls of the drive units 7a and 7b by the drive control units 6a and 6b, the drive units 7a and 7b drive the upper wire guide 8a and the lower wire guide 8b, respectively. Accordingly, relative positions of the upper wire guide 8a and the lower wire guide 8b with respect to the workpiece 14 are controlled according to the upper-portion drive command and the lower-portion drive command corresponding to the machining shape. As a result, the workpiece 14 is cut and machined into a shape corresponding to the machining shape. During the machining, the power-supply control unit 15 controls the power supply 11 to keep an electric discharge phenomenon between the wire electrode 12 and the workpiece 14 in an appropriate state according to the power supply command. In the following explanations, the upper wire guide 8a and the lower wire guide 8b are also referred to as wire guides 8.

Figure 2:
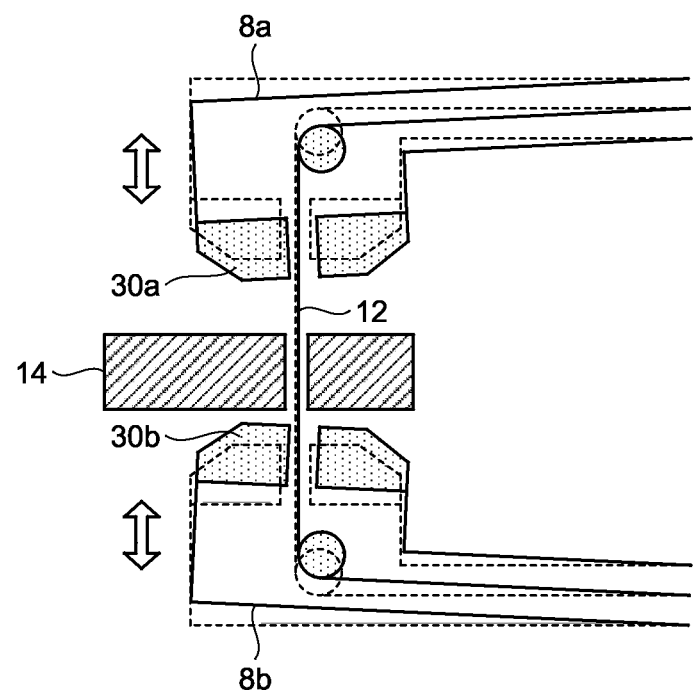
FIG. 2 is an explanatory diagram of positions of a wire electrode that change according to machining conditions.

Positions of the wire electrode 12 that change according to machining conditions are explained here. FIG. 2 is an explanatory diagram of positions of the wire electrode that change according to machining conditions.

FIG. 2 is a cross-sectional view of the wire guides 8. A wire tension is applied between a pair of the upper wire guide 8a and the lower wire guide 8b to keep the wire electrode 12 linear.

As shown in FIG. 2, amounts of elastic deformation of the wire guides 8 are large when the wire tension is large. In FIG. 2, the upper wire guide 8a and the lower wire guide 8b in a case where the wire guides 8 are elastically deformed (when the wire tension is large) are shown by solid lines.

When the wire tension is small, the elastic deformation amounts of the wire guides 8 are small. In FIG. 2, the upper wire guide 8a and the lower wire guide 8b in a case where the wire guides 8 are not elastically deformed are shown by broken lines. The wire electrode 12 in the case where the wire guides 8 are elastically deformed is shown by a solid line, and the wire electrode 12 in the case where the wire guides 8 are not elastically deformed is shown by a broken line.

When the elastic deformation amounts of the wire guides 8 change, the wire electrode 12 is pulled to a position according to the elastic deformation amounts because the wire electrode 12 is supported by the wire guides 8. When the wire tension changes in this way, a position of the workpiece 14 cut by the wire electrode 12 changes according to the magnitude of the wire tension, resulting in an error in the machining position.

Figure 3:
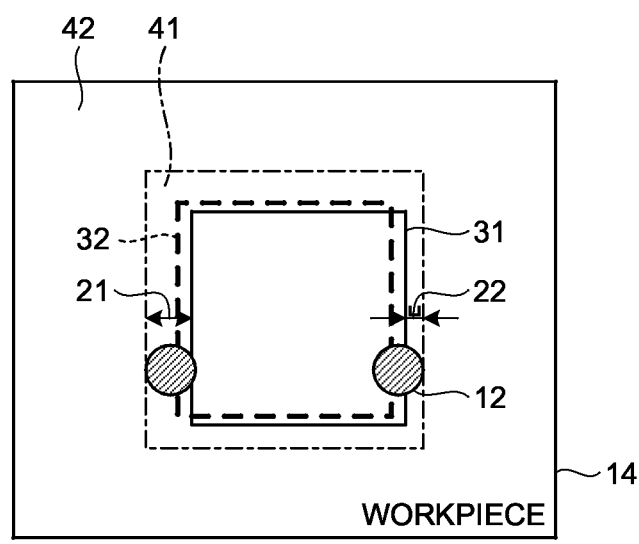
FIG. 3 is a schematic diagram for explaining an influence of wire position displacement in rough machining on finish machining.

FIG. 3 is a schematic diagram for explaining an influence of wire position displacement during rough machining on finish machining. FIG. 3 is a top view of the workpiece 14 (a cross-sectional view of the wire electrode 12). For example, when the inside (an inner region 41) of the workpiece 14 is to be machined, the workpiece 14 is rough-machined along a rough machining line 31 shown by a solid line, and then the workpiece 14 is finish-machined along a finish machining line 32 shown by a broken line. This removes the inner region 41 from the workpiece 14 and leaves a substantially-annular external area 42. In FIG. 3, an approach line to the inner region 41 of the workpiece 14 is not shown.

For example, the wire tension is set lower during the rough machining and is set higher during the finish machining. Accordingly, the elastic deformation amounts of the wire guides 8 differ between during the rough machining and during the finish machining. As a result, a difference in positions of the wire electrode 12 on the workpiece 14 is produced.

As shown in FIG. 3, when rough machining using a rough machining condition is performed with no position correction on the wire electrode 12, the workpiece 14 is machined with a trajectory along the rough machining line 31. However, during finish machining using a finish machining condition, elastic deformation amounts of the wire guides 8 are different from those during the rough machining. Accordingly, the wire electrode 12 machines the workpiece 14 with a trajectory along the finish machining line 32 displaced from the rough machining line 31. At that time, a removal amount 21 of the workpiece 14 is larger when the finish machining is performed at a position of the workpiece 14 shown on the left side of FIG. 3. In contrast, a removal amount 22 of the workpiece 14 is smaller when the finish machining is performed at a position of the workpiece 14 shown on the right side of FIG. 3. Therefore, when the rough machining is performed with no position correction of the wire electrode 12, machining accuracy on the machining surface is reduced and the machining time is increased, at a position (a machining surface) where the machining removal amount is larger.

In the present embodiment, when the rough machining is performed, the workpiece 14 is machined in such a manner that the rough machining line 31 is matched with the finish machining line 32 by correcting the position of the wire electrode 12. According to the present embodiment, the positions of the wire electrode 12 during the rough machining and during the finish machining are matched in response to an identical position command. This uniformizes the removal amounts during the finish machining regardless of the machining direction, which enhances the machining accuracy on the machining surface and increases the machining speed.

Referring back to FIG. 1, the machining-condition setting unit 2, the correction-amount storage unit 3, the correction-amount reading unit 4, and the wire-position correction unit 5 are explained. The correction-amount storage unit 3 is a memory that has wire-position correction amounts stored therein. The correction-amount storage unit 3 previously stores the wire-position correction amounts for respective machining conditions.

The machining-condition setting unit 2 sets an externally-input machining condition in the control device 10. The machining condition set by the machining-condition setting unit 2 includes a wire tension, for example. The machining condition can be a type of machining such as the rough machining or the finish machining. In this case, a correspondence relation between machining types and machining conditions is previously registered in the machining-condition setting unit 2. The machining-condition setting unit 2 extracts a machining condition corresponding to a machining type, based on the registered correspondence relation, and sets the extracted machining condition in the control device 10.

When machining of the workpiece 14 is to be performed, the correction-amount reading unit 4 reads the machining condition from the machining-condition setting unit 2 and reads the wire-position correction amounts corresponding to the machining condition from the correction-amount storage unit 3. The correction-amount reading unit 4 transmits the read wire-position correction amount to the wire-position correction unit 5.

The wire-position correction unit 5 corrects control positions controlled by the drive control units 6a and 6b, according to the wire-position correction amount. In other words, the wire-position correction unit 5 corrects control commands (control positions) that are output from the drive control units 6a and 6b to the drive units 7a and 7b, based on the wire-position correction amount. Accordingly, the drive units 7a and 7b correct the positions of the wire guides 8 to the control positions corrected based on the wire-position correction amount.

A position correction process procedure for the wire electrode 12 according to the first embodiment is explained next. The wire-position correction amounts associated with the machining conditions are stored in the correction-amount storage unit 3. The machining-condition setting unit 2 sets an externally-input machining condition in the control device 10. A machining shape is input to the command generation unit 9. The command generation unit 9 generates commands for the drive control units 6a and 6b and the power-supply control unit 15, based on the input machining shape.

The power-supply control unit 15 controls the power supply 11 based on the power supply command. The drive control unit 6a controls the drive unit 7a based on the upper-portion drive command, and the drive control unit 6b controls the drive unit 7b based on the lower-portion drive command.

At that time, the correction-amount reading unit 4 reads the machining condition from the machining-condition setting unit 2 and reads the wire-position correction amounts corresponding to the machining condition, from the correction-amount storage unit 3. The correction-amount reading unit 4 transmits the read wire-position correction amount to the wire-position correction unit 5.

The wire-position correction unit 5 corrects the control positions controlled by the drive control units 6a and 6b according to the wire-position correction amount. This causes the drive units 7a and 7b to correct the positions of the wire guides 8 to the control positions corrected based on the wire-position correction amount. As a result, the position of the wire electrode 12 is corrected to a position according to the machining condition.

While the case where the upper wire guide 8a and the lower wire guide 8b are driven is explained in the present embodiment, it suffices to drive at least two of the upper wire guide 8a, the lower wire guide 8b, and the workpiece 14. For example, an effect identical to that obtained in the case where the positions of the upper wire guide 8a and the lower wire guide 8b are controlled can be obtained by controlling a relative position between the workpiece 14 and the wire electrode 12 and a tilt of the wire electrode 12.

The position of the wire electrode 12 can be corrected by correcting at least one of the finish machining line 32 and the rough machining line 31. For example, when the finish machining is performed, the position of the wire electrode 12 can be corrected to match the finish machining line 32 with the rough machining line 31.

While the case where a pair of wire guides 8 are the upper wire guide 8a and the lower wire guide 8b is explained in the present embodiment, the pair of wire guides 8 can be placed in any direction. For example, the pair of wire guides 8 can be horizontally placed. In this case, one of the wire guides is placed on the right side, and the other wire guide is place on the left side. In this way, one of the wire guides is placed at a first position and the other wire guide is placed at a second position that opposes the first position, with the workpiece 14 sandwiched therebetween.

As described above, according to the first embodiment, since the wire position correction according to the machining condition such as the wire tension is performed, the relative position between the wire electrode 12 and the workpiece 14 that changes depending on the machining condition can be corrected. In this way, a highly accurate contour machining shape that is not influenced by the machining condition can be obtained. For example, when the machining conditions differ between the rough machining and the finish machining, the machining removal amounts during the finish machining can be uniformized. Therefore, as compared to a case where no position correction on the wire electrode 12 based on the wire tension is performed, the machining accuracy on the machining surface is enhanced and the machining time can be reduced.

Second Embodiment

A second embodiment of the present invention is explained next with reference to FIG. 4. While the wire tension is considered as the machining condition in the first embodiment, the position correction on the wire electrode 12 is performed considering also a reaction force (a machining fluid pressure) of the machining fluid 13 in the second embodiment.

Figure 4:
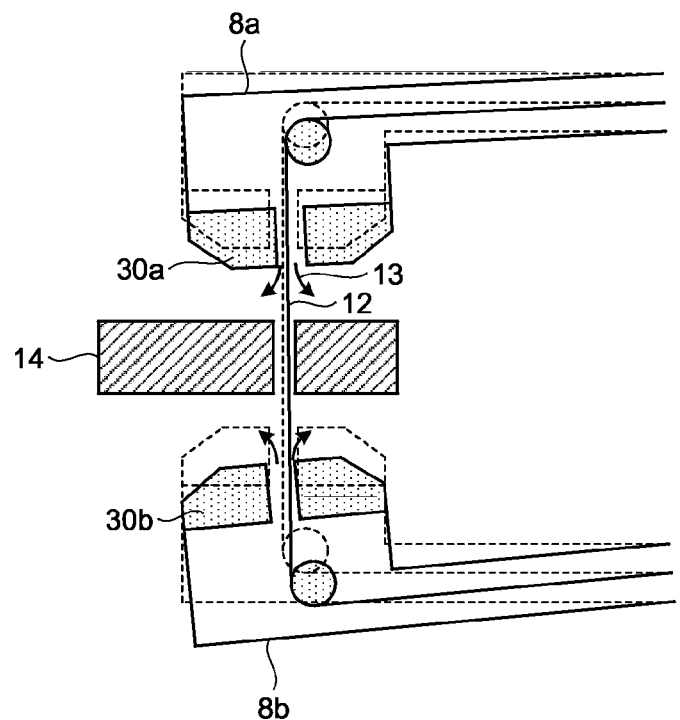
FIG. 4 is an explanatory diagram of elastic deformation of wire guides caused by a wire tension and a machining fluid pressure.

FIG. 4 is an explanatory diagram of elastic deformation of wire guides caused by a wire tension and a machining fluid pressure. FIG. 4 depicts, in section, positions of the wire guides 8 and the wire electrode 12 that change depending on the wire tension and the machining fluid pressure (pressure of the machining fluid).

A downward wire tension of the wire electrode 12 and an upward machining reaction force (a machining fluid pressure) of the machining fluid 13 are applied to the upper wire guide 8a. FIG. 4 depicts the upper wire guide 8a in a case where the influence of the wire tension is larger than that of the machining-fluid reaction force and the upper wire guide 8a is elastically deformed downward.

Similarly, an upward wire tension of the wire electrode 12 and a downward machining-fluid reaction force of the machining fluid 13 are applied to the lower wire guide 8b. FIG. 4 depicts the lower wire guide 8b in a case where the influence of the machining-fluid reaction force is larger than that of the wire tension and the lower wire guide 8b is elastically deformed downward.

The amount of elastic deformation toward the workpiece 14 is larger when the wire tension is larger, and the amount of elastic deformation away from the workpiece 14 is larger when the machining-fluid reaction force is larger. In FIG. 4, the upper wire guide 8a and the lower wire guide 8b elastically deformed are shown by solid lines.

The upper wire guide 8a and the lower wire guide 8b without elastic deformation are shown by broken lines. The wire electrode 12 in the case where the wire guides 8 are elastically deformed is shown by a solid line and the wire electrode 12 in the case where the wire guides 8 are not elastically deformed is shown by a broken line.

The machining-condition setting unit 2, the correction-amount storage unit 3, and the correction-amount reading unit 4 according to the present embodiment are explained here. Wire-position correction amounts set for each of combinations of the wire tension and the machining-fluid pressure (a correspondence relation of the machining conditions and the wire-position correction amounts) are previously stored in the correction-amount storage unit 3 according to the present embodiment. At that time, the correction-amount storage unit 3 stores therein a wire-position correction amount for correcting a relative position between the upper wire guide 8a and the workpiece 14 and a wire-position correction amount for correcting a relative position between the lower wire guide 8b and the workpiece 14, with respect to each machining condition. The wire-position correction amount for the upper wire guide 8a and the wire-position correction amount for the lower wire guide 8b can be set to the same value.

The machining-condition setting unit 2 according to the present embodiment sets the wire tension and the machining fluid pressure in the control device 10 as the machining condition externally input. When machining of the workpiece 14 is performed, the correction-amount reading unit 4 according to the present embodiment reads the machining condition (the wire tension and the machining fluid pressure) from the machining-condition setting unit 2 and reads one of the wire-position correction amounts corresponding to the machining condition from the correction-amount storage unit 3.

A position correction process procedure for the wire electrode 12 according to the second embodiment is explained next. Explanations of processes identical to those explained in the first embodiment will be omitted. The wire-position correction amounts associated with the machining conditions (sets of the wire tension and the machining fluid pressure) are stored in the correction-amount storage unit 3. Because the machining fluid pressures on the side of the upper wire guide 8a and on the side of the lower wire guide 8b may be different, the machining conditions for the upper wire guide 8a and the machining conditions for the lower wire guide 8b are stored as the machining conditions in the correction-amount storage unit 3.

The machining-condition setting unit 2 sets the wire tension and the machining fluid pressure as the machining condition in the control device 10. A machining shape is input to the command generation unit 9. The command generation unit 9 generates commands for the drive control units 6a and 6b and the power-supply control unit 15 based on the input machining shape.

The power-supply control unit 15 controls the power supply 11 based on a power supply command. The drive control unit 6a controls the drive unit 7a based on an upper-portion drive command, and the drive control unit 6b controls the drive unit 7b based on a lower-portion drive command. At that time, the correction-amount reading unit 4 reads the machining condition from the machining-condition setting unit 2 and reads the wire-position correction amounts corresponding to the machining condition from the correction-amount storage unit 3. Specifically, the correction-amount reading unit 4 reads, from the correction-amount storage unit 3, a wire-position correction amount (a wire-position correction amount $\Delta X1$, $\Delta Y1$, for example) for correcting the relative position between the upper wire guide 8a and the workpiece 14 corresponding to the machining condition (a combination of the wire tension and the machining fluid pressure).

Similarly, the correction-amount reading unit 4 reads, from the correction-amount storage unit 3, a wire-position correction amount (a wire-position correction amount $\Delta X2$, $\Delta Y2$, for example) for correcting the relative position between the lower wire guide 8b and the workpiece 14 corresponding to the machining condition.

The correction-amount reading unit 4 transmits the read wire-position correction amounts to the wire-position correction unit 5. The wire-position correction unit 5 corrects the control amount of the drive control unit 6a according to the wire-position correction amount $\Delta X1$, $\Delta Y1$. This causes the drive unit 7a to correct the relative position between the upper wire guide 8a and the workpiece 14.

Similarly, the wire-position correction unit 5 corrects the control amount of the drive control unit 6b according to the wire-position correction amount $\Delta X2$, $\Delta Y2$. Accordingly, the relative position between the lower wire guide 8b and the workpiece 14 is corrected via the drive unit 7b.

In this way, the wire electric discharge machining apparatus 1a corrects the relative position between the upper wire guide 8a and the workpiece 14, by using the machining condition for the upper wire guide 8a. The wire electric discharge machining apparatus 1a also corrects the relative position between the lower wire guide 8b and the workpiece 14, by using the machining condition for the lower wire guide 8b.

As described above, according to the second embodiment, since the machining condition includes the wire tension and the machining fluid pressure, the relative position between the wire electrode 12 and the workpiece 14 that changes depending on both of the wire tension and the machining fluid pressure can be corrected. Therefore, a highly accurate contour machining shape that is not influenced by the machining condition can be obtained.

Third Embodiment

A third embodiment of the present invention is explained next with reference to FIG. 5. While the wire tension and the machining fluid pressure are considered as the machining condition in the second embodiment, the position correction of the wire electrode 12 is performed considering also distances between nozzles (machining fluid nozzles) of the wire guides 8 and the workpiece 14 in the third embodiment.

Figure 5:
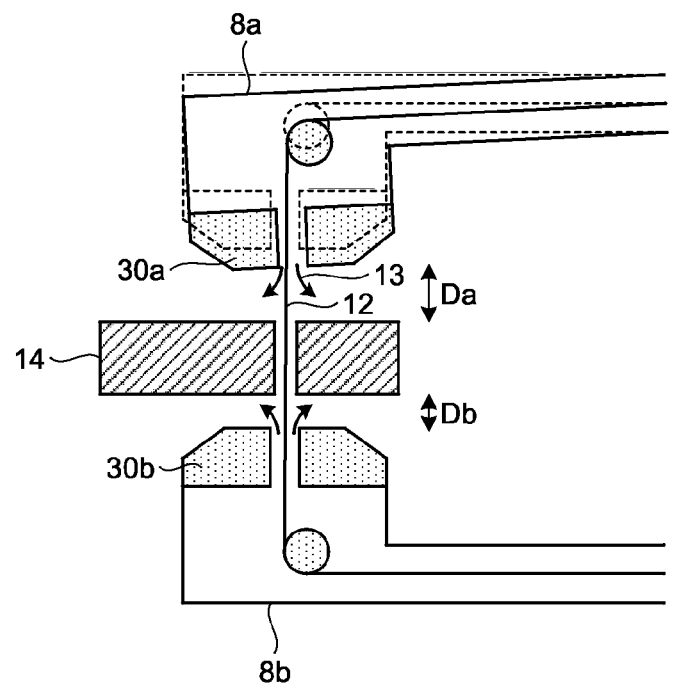
FIG. 5 is an explanatory diagram of an influence of a machining-fluid reaction force in a case where distances between nozzles of wire guides and a workpiece are larger than a predetermined value.

FIG. 5 is an explanatory diagram of an influence of a machining-fluid reaction force in a case where distances between nozzles of wire guides and a workpiece are larger than a predetermined value. The nozzle (first nozzle) 30a for delivering the machining fluid 13 is located on an end (on the side of the workpiece 14) of the upper wire guide 8a. The nozzle (second nozzle) 30b for delivering the machining fluid 13 is located on an end (on the side of the workpiece 14) of the lower wire guide 8b.

A case where a distance (hereinafter, "lower side distance Db") between the nozzle 30b and the workpiece 14 in FIG. 5 is longer than that in FIG. 4 is explained below. In this case, the lower wire guide 8b in FIG. 5 is subject to a smaller influence of the machining-fluid reaction force than the lower wire guide 8b in FIG. 4.

Therefore, even when the same wire tension and the same machining fluid pressure are applied, the elastic deformation amount of the lower wire guide 8b differs according to the lower side distance Db. Similarly, even when the same wire tension and the same machining fluid pressure are applied, the elastic deformation amount of the upper wire guide 8a differs according to a distance (hereinafter, "upper side distance Da") between the nozzle 30a of the upper wire guide 8a and the workpiece 14. In the present embodiment, the position correction of the wire electrode 12 is performed by adding the lower side distance Db and the upper side distance Da to the machining condition.

The machining-condition setting unit 2, the correction-amount storage unit 3, and the correction-amount reading unit 4 according to the present embodiment are explained here. The correction-amount storage unit 3 stores, with respect to respective machining conditions, wire-position correction amounts for correcting the relative position between the upper wire guide 8a and the workpiece 14 and wire-position correction amounts for correcting the relative position between the lower wire guide 8b and the workpiece 14. Specifically, the correction-amount storage unit 3 previously stores wire-position correction amounts (a correspondence relation between the machining conditions and the wire-position correction amounts) set for each combination of the wire tension, the machining fluid pressure, and the lower side distance Db. The correction-amount storage unit 3 previously stores wire-position correction amounts (a correspondence relation between the machining conditions and the wire-position correction amounts) set for each combination of the wire tension, the machining fluid pressure, and the upper side distance Da.

The machining-condition setting unit 2 according to the present embodiment sets the wire tension, the machining fluid pressure, the upper side distance Da, and the lower side distance Db in the control device 10 as the externally-input machining condition. The correction-amount reading unit 4 reads the machining condition from the machining-condition setting unit 2 and reads one of the wire-position correction amounts corresponding to the machining condition from the correction-amount storage unit 3 when machining of the workpiece 14 is performed.

A position correction process procedure for the wire electrode 12 according to the third embodiment is explained next. In the present embodiment, explanations of processes identical to those explained in the first and second embodiments will be omitted. The wire-position correction amounts associated with the machining conditions are stored in the correction-amount storage unit 3. The wire-position correction amounts stored in the correction-amount storage unit 3 are wire-position correction amounts for the nozzle 30a and wire-position correction amounts for the nozzle 30b. Each of the wire-position correction amounts for the nozzle 30a is associated with a set of the wire tension, the machining fluid pressure, and the upper side distance Da. Each of the wire-position correction amounts for the nozzle 30b is associated with a set of the wire tension, the machining fluid pressure, and the lower side distance Db.

The machining-condition setting unit 2 sets the wire tension, the machining fluid pressure, the upper side distance Da, and the lower side distance Db as the machining condition in the control device 10. A machining shape is input to the command generation unit 9. The command generation unit 9 generates commands for the drive control units 6a and 6b and the power-supply control unit 15 based on the input machining shape.

The power-supply control unit 15 controls the power supply 11 based on a power supply command. The drive control unit 6a controls the drive unit 7a based on an upper-portion drive command and the drive control unit 6b controls the drive unit 7b based on a lower-portion drive command. At that time, the correction-amount reading unit 4 reads the machining condition from the machining-condition setting unit 2 and reads ones of the wire-position correction amounts corresponding to the machining condition from the correction-amount storage unit 3. Specifically, the correction-amount reading unit 4 reads a wire-position correction amount for correcting the relative position between the lower wire guide 8b and the workpiece 14 corresponding to the machining condition (a combination of the wire tension, the machining fluid pressure, and the lower side distance Db) from the correction-amount storage unit 3.

Similarly, the correction-amount reading unit 4 reads a wire-position correction amount for correcting the relative position between the upper wire guide 8a and the workpiece 14 corresponding to the machining condition (a combination of the wire tension, the machining fluid pressure, and the upper side distance Da) from the correction-amount storage unit 3.

The correction-amount reading unit 4 transmits the read wire-position correction amounts to the wire-position correction unit 5. The wire-position correction unit 5 corrects the control amount of the drive control unit 6b according to the wire-position correction amount. In this way, the drive unit 7b corrects the relative position between the lower wire guide 8b and the workpiece 14.

Similarly, the wire-position correction unit 5 corrects the control amount of the drive control unit 6a according to the wire-position correction amount. Accordingly, the relative position between the upper wire guide 8a and the workpiece 14 is corrected via the drive unit 7a.

As described above, according to the third embodiment, the machining condition includes the wire tension, the machining fluid pressure, the upper side distance Da, and the lower side distance Db and therefore the relative position between the wire electrode 12 and the workpiece 14 changing depending on the wire tension, the machining fluid pressure, the upper side distance Da, and the lower side distance Db can be corrected. Therefore, a highly accurate contour machining shape that is not influenced by the machining condition can be obtained.

Fourth Embodiment

A fourth embodiment of the present invention is explained with reference to FIG. 6. While the wire tension, the machining fluid pressure, the upper side distance Da, and the lower side distance Db are considered as the machining condition in the third embodiment, the position correction of the wire electrode 12 is performed considering also deformation of the wire electrode 12 itself in the fourth embodiment.

Figure 6:
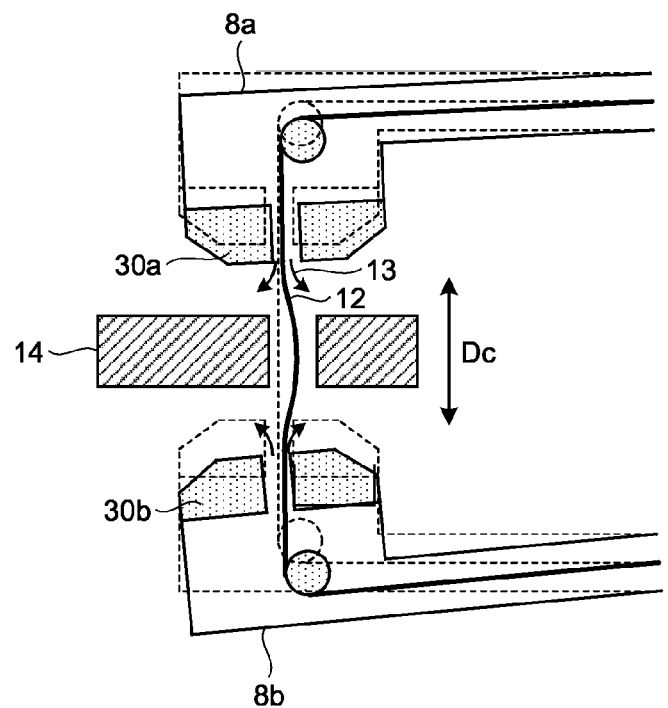
FIG. 6 is an explanatory diagram of a machining error caused by deformation of a wire electrode.

FIG. 6 is an explanatory diagram of a machining error caused by deformation of a wire electrode. In addition to elastic deformation of the wire guides 8 due to the wire tension and the machining-fluid reaction force, the wire electrode 12 deforms depending on the machining condition. This changes the relative position between the wire electrode 12 and the workpiece 14.

The wire electrode 12 deforms more easily when the stiffness thereof changing depending on wire materials is lower. The wire electrode 12 deforms more easily when the diameter of the wire electrode 12 is smaller. Furthermore, the wire electrode 12 deforms more easily when the distance between the wire guide 8a and the wire guide 8b is longer.

In the present embodiment, the stiffness and the diameter of the wire electrode 12 and the distance (hereinafter, "inter-guide distance Dc") between the pair of the wire guides 8a and 8b are included in the machining condition in addition to the wire tension, the machining fluid pressure, the upper side distance Da, and the lower side distance Db. The wire electric discharge machining apparatus 1a then performs the position correction of the wire electrode 12 considering deformation of the wire electrode 12.

The machining-condition setting unit 2, the correction-amount storage unit 3, and the correction-amount reading unit 4 according to the present embodiment are explained here. Wire-position correction amounts each being set for each combination of the wire tension, the machining fluid pressure, the upper wire guide 8a or the lower side distance Db, the stiffness (a wire stiffness) of the wire electrode 12, the diameter (a wire diameter) of the wire electrode 12, and the inter-guide distance Dc are previously stored in the correction-amount storage unit 3 according to the present embodiment.

The machining-condition setting unit 2 according to the present embodiment sets the wire tension, the machining fluid pressure, the upper side distance Da, the lower side distance Db, the stiffness of the wire electrode 12, the diameter of the wire electrode 12, and the inter-guide distance Dc in the control device 10 as the machining condition externally input. The correction-amount reading unit 4 reads the machining condition from the machining-condition setting unit 2 and reads one of the wire-position correction amounts corresponding to the machining condition from the correction-amount storage unit 3 when machining of the workpiece 14 is performed.

A position correction process procedure for the wire electrode 12 according to the fourth embodiment is explained next. Because a position correction process using the upper wire guide 8a and a position correction process using the lower wire guide 8b are the same, the position correction process using the upper wire guide 8a is explained below. Explanations of processes identical to those explained in the first to third embodiments will be omitted.

The wire-position correction amounts associated with the machining conditions are stored in the correction-amount storage unit 3. Wire-position correction amounts for the nozzle 30a are associated with sets of the wire tension, the machining fluid pressure, the upper side distance Da, the stiffness of the wire electrode 12, the diameter of the wire electrode 12, and the inter-guide distance Dc, respectively.

The machining-condition setting unit 2 sets the wire tension, the machining fluid pressure, the upper side distance Da, the stiffness of the wire electrode 12, the diameter of the wire electrode 12, and the inter-guide distance Dc in the control device 10 as the machining condition. When the drive control unit 6b controls the drive unit 7b based on a lower-portion drive command, the correction-amount reading unit 4 reads the machining condition from the machining-condition setting unit 2 and reads one of the wire-position correction amounts corresponding to the machining condition from the correction-amount storage unit 3. Specifically, the correction-amount reading unit 4 reads a wire-position correction amount for correcting the relative position between the upper wire guide 8a and the workpiece 14 corresponding to the machining condition (a combination of the wire tension, the machining fluid pressure, the upper side distance Da, the stiffness of the wire electrode 12, the diameter of the wire electrode 12, and the inter-guide distance) from the correction-amount storage unit 3.

The wire-position correction unit 5 then corrects the control amount of the drive control unit 6b according to the wire-position correction amount. Accordingly, the relative position between the upper wire guide 8a and the workpiece 14 is corrected via the drive unit 7a.

The machining-condition setting unit 2 can set the material of the wire electrode 12 instead of the stiffness of the wire electrode 12. In this case, the stiffness (such as an elastic modulus) of the wire electrode 12 associated with the material of the wire electrode 12 is stored in the correction-amount storage unit 3. The correction-amount reading unit 4 extracts the stiffness of the wire electrode 12 based on the association in the correction-amount storage unit 3. Also in this case, an identical effect to that obtained in the case where the stiffness of the wire electrode 12 is set in the machining-condition setting unit 2 can be obtained.

The shape, the stiffness, and the material of the wire guides 8, and the shape, the stiffness, and the material of the nozzles 30a and 30b can be further added as the machining condition. In this case, accuracy in the machining contour can be further enhanced by performing the position correction of the wire electrode 12 considering deformation of the wire guides 8 or deformation of the nozzle 30a or 30b.

As described above, according to the fourth embodiment, the machining condition includes the wire tension, the machining fluid pressure, the upper side distance Da, the lower side distance Db, the stiffness of the wire electrode 12, the diameter of the wire electrode 12, and the inter-guide distance Dc. Therefore, the relative position between the wire electrode 12 and the workpiece 14, which changes depending on the wire tension, the machining fluid pressure, the upper side distance Da, the lower side distance Db, the stiffness of the wire electrode 12, the diameter of the wire electrode 12, and the inter-guide distance Dc can be corrected. Therefore, a highly accurate contour machining shape that is not influenced by the machining condition can be obtained.

Fifth Embodiment

A fifth embodiment of the present invention is explained next with reference to FIG. 7. While the wire tension, the machining fluid pressure, the upper side distance Da, the lower side distance Db, the stiffness of the wire electrode 12, the diameter of the wire electrode 12, and the inter-guide distance Dc are considered as the machining condition in the fourth embodiment, the position correction of the wire electrode 12 is performed considering also an elastic deformation amount of the workpiece 14 caused by the machining fluid pressure in the fifth embodiment.

Figure 7:
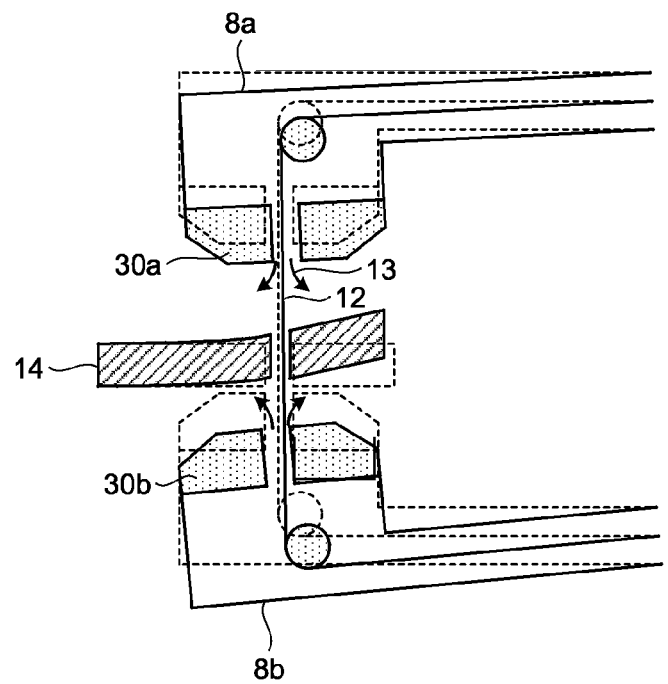
FIG. 7 is an explanatory diagram of elastic deformation of a workpiece caused by a machining-fluid reaction force.

FIG. 7 is an explanatory diagram of elastic deformation of a workpiece caused by a machining-fluid reaction force. In addition to elastic deformation of the wire guides 8 due to the wire tension and the machining-fluid reaction force, the workpiece 14 is elastically deformed by the machining-fluid reaction force. This changes the relative position between the wire electrode 12 and the workpiece 14.

In the present embodiment, the shape (such as a length from a support point to a machining point and the sheet thickness) and the stiffness of the workpiece 14 are included in the machining condition in addition to the wire tension, the machining fluid pressure, the upper side distance Da, the lower side distance Db, the stiffness of the wire electrode 12, the diameter of the wire electrode 12, and the inter-guide distance Dc. The wire electric discharge machining apparatus 1a performs the position correction of the wire electrode 12 considering the shape and stiffness of the workpiece 14.

The machining-condition setting unit 2, the correction-amount storage unit 3, and the correction-amount reading unit 4 according to the present embodiment are explained. Wire-position correction amounts each being set for each combination of the wire tension, the machining fluid pressure, the upper wire guide 8a or the lower side distance Db, the stiffness of the wire electrode 12, the diameter of the wire electrode 12, the inter-guide distance Dc, and the shape/stiffness information (the shape and stiffness) of the workpiece 14 are previously stored in the correction-amount storage unit 3 according to the present embodiment.

The machining-condition setting unit 2 according to the present embodiment sets the wire tension, the machining fluid pressure, the upper side distance Da, the lower side distance Db, the stiffness of the wire electrode 12, the diameter of the wire electrode 12, the inter-guide distance Dc, and the shape/stiffness information in the control device 10 as the machining condition externally input. The correction-amount reading unit 4 reads the machining condition from the machining-condition setting unit 2 and reads one of the wire-position correction amounts corresponding to the machining condition from the correction-amount storage unit 3 when machining of the workpiece 14 is performed.

A position correction process procedure for the wire electrode 12 according to the fourth embodiment is explained next. Because a position correction process using the upper wire guide 8a and a position correction process using the lower wire guide 8b are the same, the position correction process using the upper wire guide 8a is explained below. Explanations of processes identical to those explained in the first to third embodiments will be omitted.

The wire-position correction amounts associated with the machining conditions are stored in the correction-amount storage unit 3. Each of wire-position correction amounts for the nozzle 30a is associated with a set of the wire tension, the machining fluid pressure, the upper side distance Da, the stiffness of the wire electrode 12, the diameter of the wire electrode 12, the inter-guide distance Dc, and the shape/stiffness information.

The machining-condition setting unit 2 sets the wire tension, the machining fluid pressure, the upper side distance Da, the stiffness of the wire electrode 12, the diameter of the wire electrode 12, the inter-guide distance Dc, and the shape/stiffness information in the control device 10 as the machining condition. When the drive control unit 6b controls the drive unit 7b according to a lower-portion drive command, the correction-amount reading unit 4 reads the machining condition from the machining-condition setting unit 2 and reads one of the wire-position correction amounts corresponding to the machining condition from the correction-amount storage unit 3. Specifically, the correction-amount reading unit 4 reads a wire-position correction amount for correcting the relative position between the upper wire guide 8a and the workpiece 14 corresponding to the machining condition (a combination of the wire tension, the machining fluid pressure, the upper side distance Da, the stiffness of the wire electrode 12, the diameter of the wire electrode 12, the inter-guide distance Dc, and the shape/stiffness information) from the correction-amount storage unit 3.

The wire-position correction unit 5 corrects the control amount of the drive control unit 6b according to the wire-position correction amount. Accordingly, the relative position between the upper wire guide 8a and the workpiece 14 is corrected via the drive unit 7a.

The machining-condition setting unit 2 can set the material of the workpiece 14 instead of the stiffness of the workpiece 14. In other words, the shape and material of the workpiece 14 can be set as the shape/stiffness information. In this case, the stiffness (such as an elastic modulus) of the workpiece 14 associated with the material of the workpiece 14 is stored in the correction-amount storage unit 3. The correction-amount reading unit 4 reads the stiffness of the workpiece 14 based on the association in the correction-amount storage unit 3 and the material in the shape/stiffness information. Also in this case, an identical effect to that in the case where the shape and stiffness of the workpiece 14 are set as the shape/stiffness information can be obtained.

Because the shape of the workpiece 14 changes with progression of machining, the wire electric discharge machining apparatus 1a can use plural kinds of shape/stiffness information according to progression of the machining. The size or weight of the workpiece 14 can be added to the shape/stiffness information.

As described above, according to the fifth embodiment, because the machining condition includes the wire tension, the machining fluid pressure, the upper side distance Da, the lower side distance Db, the stiffness of the wire electrode 12, the diameter of the wire electrode 12, the inter-guide distance Dc, and the shape/stiffness information, the relative position between the wire electrode 12 and the workpiece 14 changing depending on the wire tension, the machining fluid pressure, the upper side distance Da, the lower side distance Db, the stiffness of the wire electrode 12, the diameter of the wire electrode 12, and the shape/stiffness information can be corrected. Therefore, a highly accurate contour machining shape that is not influenced by the machining condition can be obtained.

Sixth Embodiment

A sixth embodiment of the present invention is explained next with reference to FIGS. 8-1 to 10. In the sixth embodiment, the wire-position correction amounts to be stored in the correction-amount storage unit 3 are determined based on machining-shape measurement results (shapes after machining) of the workpiece 14 that is machined on various machining conditions.

A method of setting a wire-position correction amount based on machining shape measurement of the workpiece 14 is explained first. FIG. 8-1 is an example of results of machining shape measurement of a workpiece. FIG. 8-1 is a top view of the workpiece 14 after machining. In FIG. 8-1, the X-axis direction is the same direction as a reference surface 50 and the Y-axis direction is a direction perpendicular to the reference surface 50. FIG. 8-2 is an example of wire-position correction amounts for respective machining conditions.

The wire electric discharge machining apparatus 1a machines the workpiece 14 on various machining conditions. At that time, the reference surface 50 is machined on a machining condition that achieves most accurate machining to obtain a comparison target reference to other machining conditions. By sequentially performing machining on plural machining conditions, an influence of a machining shape error due to other factors, such as an installation error in the workpiece 14, can be prevented.

After completion of the machining, the shape of the workpiece 14 is measured to know a machining contour error depending on the machining condition. In the example shown in FIG. 8-1, shapes of the workpiece 14 obtained when machining using the reference surface 50 and machining conditions (1) to (4) is performed are shown. Measurement results of the machining shape of the workpiece 14 are stored in the correction-amount storage unit 3.

For example, when a machining surface (a surface after completion of the machining) on the machining condition (1) is −2 micrometers with respect to the reference surface 50, a wire-position correction amount 51 in the Y-axis direction on the machining condition (1) is +2 micrometers. In this case, +2 micrometers is stored in the correction-amount storage unit 3 as the wire-position correction amount 51 in the Y-axis direction. In this way, during machining after the correction, machining is performed with correction of the wire position by +2 micrometers in the Y-axis direction. As a result, the machining surface on the machining condition (1) can be aligned with the reference surface 50.

In the correction-amount storage unit 3, the wire-position correction amounts on the machining conditions actually used are exhaustively stored, for example. When there are too many combinations of machining conditions, the wire-position correction amounts can be derived by interpolation of machining conditions. In this way, appropriate wire position correction can be realized with fewer measurement points and fewer machining-condition setting points.

For example, when the wire-position correction amounts shown in FIG. 8-2 are stored in the correction-amount storage unit 3 and when the wire tension=10 and the machining fluid pressure=3, the wire-position correction amount can be set at (2+0)/2=1 by interpolation between the machining conditions (1) and (2).

Similarly, when the wire tension=9 and the machining fluid pressure=2, the wire-position correction amount can be set at (0+1.5)/2=0.75 by interpolation between the machining conditions (2) and (4). Furthermore, when the wire tension=9 and the machining fluid pressure=3, the wire-position correction amount is set at (2+0−3+1.5)/4=0.125 by interpolation of the machining conditions (1), (2), (3), and (4).

Additional interpolation between machining conditions can be performed using the wire-position correction amounts derived by interpolation. For example, when the wire tension=10 and the machining fluid pressure=3.5, the wire-position correction amount is derived using the wire-position correction amount obtained by interpolation between the machining conditions (1) and (2) and the wire-position correction amount of the machining condition (1). In this case, the wire-position correction amount can be set at (1+2)/2=1.5.

Figure 9:
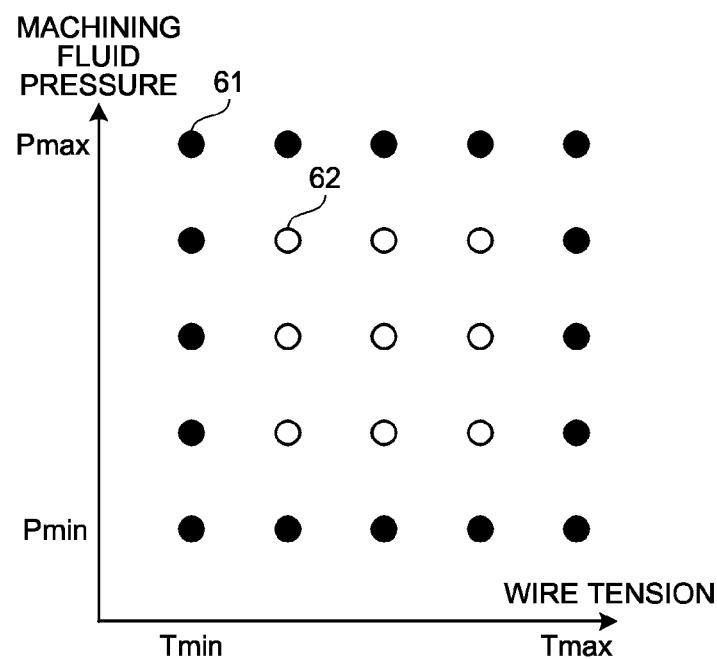
FIG. 9 is an explanatory diagram of interpolation points of machining conditions in a case where a wire-position correction amount is actually measured at points with practical maximum and minimum values of the machining conditions.
Figure 10:
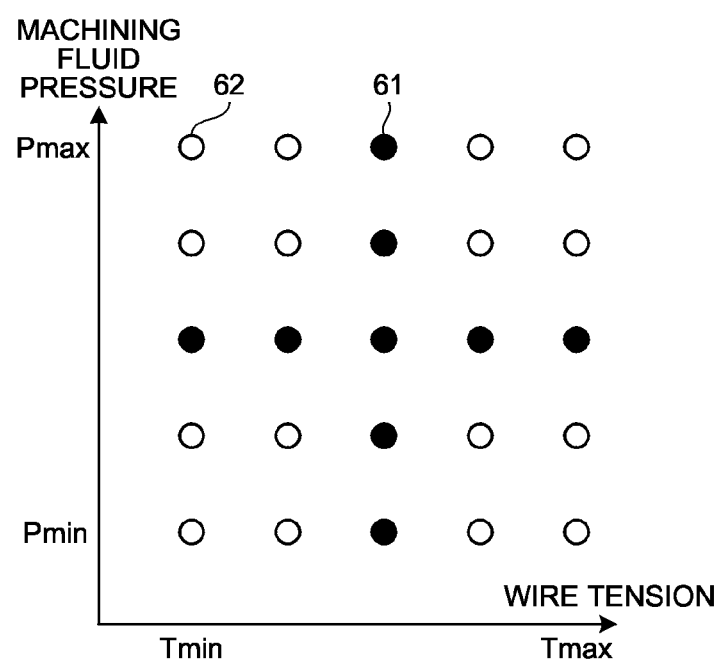
FIG. 10 is an explanatory diagram of interpolation points of a machining condition in a case where a wire-position correction amount is actually measured at practical center values of the machining condition.

FIGS. 9 and 10 are explanatory diagrams of actual measurement points and interpolation points of the wire-position correction amount (a machining condition). The actual measurement points are points (machining conditions) at which the wire-position correction amounts are set by actually machining the workpiece 14 using machining conditions and measuring the machining shape. The interpolation points are points (machining conditions) at which the wire-position correction amounts are set by the interpolation process using the wire-position correction amounts obtained at the actual measurement points.

FIG. 9 is an explanatory diagram of interpolation points of machining conditions in a case where a wire-position correction amount is actually measured at points with practical maximum and minimum values of the machining conditions. In FIG. 9, the machining condition is a combination of the wire tension and the machining fluid pressure, in which the wire tension is shown on the X-axis and the machining fluid pressure is shown on the Y-axis.

In FIG. 9, actual measurement points 61 (black dots) and interpolation points 62 (white dots) in a case where the workpiece 14 is machined on the machining conditions principally including practical maximum and minimum values of the wire tension and practical maximum and minimum values of the machining fluid pressure are shown.

As described above, in the present embodiment, machining results are measured on the machining conditions at the actual measurement points 61 and the machining conditions at the interpolation points 62 are interpolated by linear interpolation or the like. Because a factor of the position displacement of the wire electrode 12 is elastic deformation of the wire guides 8 due to at least one of the wire tension and the machining-fluid reaction force, it is considered that the position displacement amount of the wire electrode 12 has linearity.

As for the machining fluid pressure, adjustment on the setting value of the machining fluid pressure is performed considering the distances (the upper side distance Da and the lower side distance Db) between the nozzles 30a and 30b and the workpiece 14. For example, the setting value of the machining fluid pressure is adjusted by creating a reference table or an approximate expression based on the actual measurement results of the machining fluid pressure. This enables derivation of the wire-position correction amounts corresponding to the actually-used machining conditions with fewer measurement points (the actual measurement points 61). Therefore, it is possible to reduce the number of times of actual machining of the workpiece 14 during derivation of the wire-position correction amounts.

FIG. 10 is an explanatory diagram of interpolation points of a machining condition in a case where a wire-position correction amount is actually measured at practical center values of the machining condition. In FIG. 10, the machining condition is a combination of the wire tension and the machining fluid pressure as in FIG. 9, in which the wire tension is shown on the X-axis and the machining fluid pressure is shown on the Y-axis. In FIG. 10, the actual measurement points 61 (black dots) and the interpolation points 62 (white dots) in a case where the workpiece 14 is machined on the machining conditions principally including a practical center value of the wire tension and a practical center of the machining fluid pressure are shown.

Also in this case, the wire-position correction amounts corresponding to the actually-used machining conditions can be derived with fewer measurement points (the actual measurement points 61) as in the case shown in FIG. 9. Therefore, the number of times of actual machining of the workpiece 14 can be reduced.

As described above, according to the sixth embodiment, the wire-position correction amounts to be stored in the correction-amount storage unit 3 are determined based on the machining-shape measurement results of the workpiece 14 that are machined on various machining conditions. Therefore, highly accurate wire position correction can be easily realized.

Furthermore, because the wire-position correction amounts on the machining conditions that are not measured are estimated from the wire-position correction amounts on the measured machining conditions by linear interpolation, desired wire-position correction amounts can be easily derived with fewer times of measurement.

Seventh Embodiment

A seventh embodiment of the present invention is explained next with reference to FIG. 11. In the seventh embodiment, positions of the wire guides 8 during machining are measured while the wire-position correction amounts are derived by the method as explained in the sixth embodiment. The wire-position correction amounts to be stored in the correction-amount storage unit 3 are set based on the measurement results.

Figure 11:
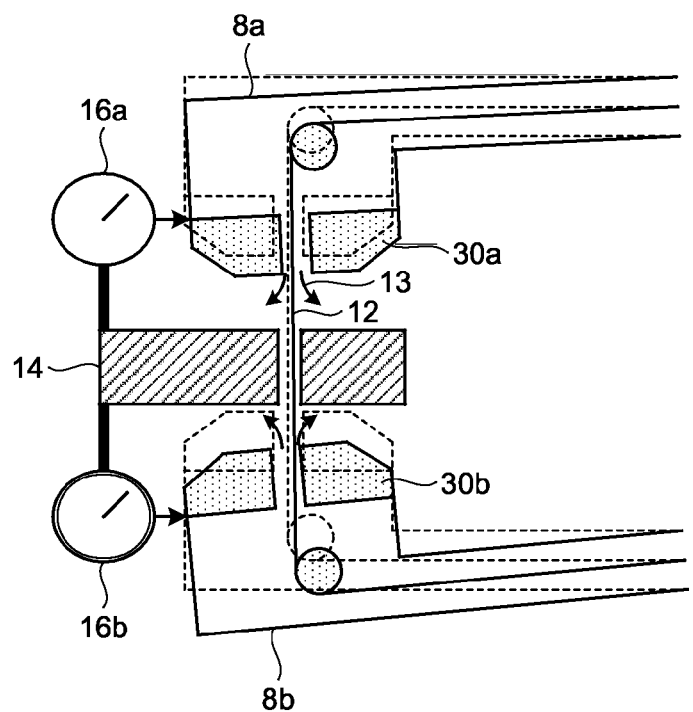
FIG. 11 is an explanatory diagram of a method of measuring displacement amounts of wire guides.

FIG. 11 is an explanatory diagram of a method of measuring displacement amounts of wire guides. In the present embodiment, position meters 16a and 16b that measure the positions (displacement amounts) of the wire guides 8 are installed in the wire electric discharge machining apparatus 1a. While the wire-position correction amounts are derived using various machining conditions, the position meters 16a and 16b measure the positions of the wire guides 8 during machining. Specifically, the position meter 16a measures the position of the upper wire guide 8a during machining and the position meter 16b measures the position of the lower wire guide 8b during machining.

The position meters 16a and 16b measure, for example, relative distances between the workpiece 14 and the wire guides 8. Therefore, the position meters 16a and 16b are placed, for example, at positions where the relative distances between the workpiece 14 and the wire guides 8 can be measured. When this placement is difficult, the position meters 16a and 16b can be fixed to a mount (not shown) of the wire electric discharge machining apparatus 1a. In this case, the position meters 16a and 16b measure distances between the wire guides 8 and the mount of the wire electric discharge machining apparatus 1a. When the positions of the wire guides 8 are measured by the position meters 16a and 16b, the wire-position correction amount is set based on the measured positions.

As described above, according to the seventh embodiment, the displacement amounts of the wire guides 8 during machining are measured on various machining conditions and the wire-position correction amounts to be stored in the correction-amount storage unit 3 are determined based on the measurement results of the displacement amounts. Therefore, highly accurate wire position correction can be realized.

Eighth Embodiment

An eighth embodiment of the present invention is explained next with reference to FIG. 12. In the eighth embodiment, while the wire-position correction amounts are derived by the method explained in the sixth embodiment, positions of the wire guides 8 and a displacement amount of the workpiece 14 during machining are measured. The wire-position correction amounts to be stored in the correction-amount storage unit 3 are set based on the measurement results.

Figure 12:
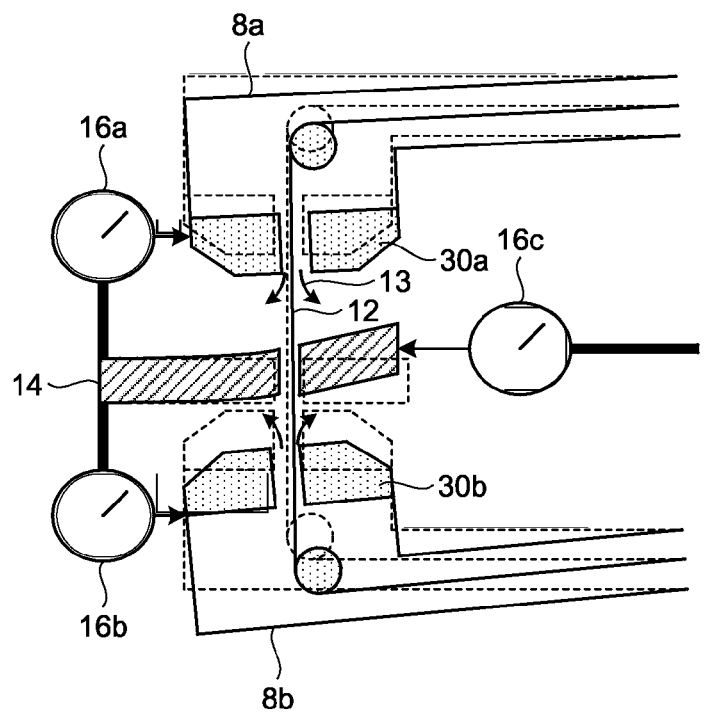
FIG. 12 is an explanatory diagram of a method of measuring displacement amounts of wire guides and a displacement amount of a workpiece.

FIG. 12 is an explanatory diagram of a method of measuring displacement amounts of wire guides and a displacement amount of a workpiece. A position meter 16c is a device that measures the position (the displacement amount) of the workpiece 14 with respect to the mount of the wire electric discharge machining apparatus 1a.

When the position of the workpiece 14 is measured by the position meter 16c, the wire-position correction amount is set based on the measured displacement amount of the workpiece 14. Accordingly, the relative position between the wire electrode 12 and the workpiece 14 can be corrected with high accuracy. A procedure of creating the wire-position correction amounts to be stored in the correction-amount storage unit 3 based on the measurement results of the machining shape of the workpiece 14 is identical to that of the sixth embodiment, and thus explanations thereof will be omitted.

As described above, according to the eighth embodiment, the displacement amount of the workpiece 14 during machining on various machining conditions is measured and the wire-position correction amounts to be stored in the correction-amount storage unit 3 are determined based on measurement results of the displacement amount. Therefore, highly accurate wire position correction can be realized.

Ninth Embodiment

Figure 13:
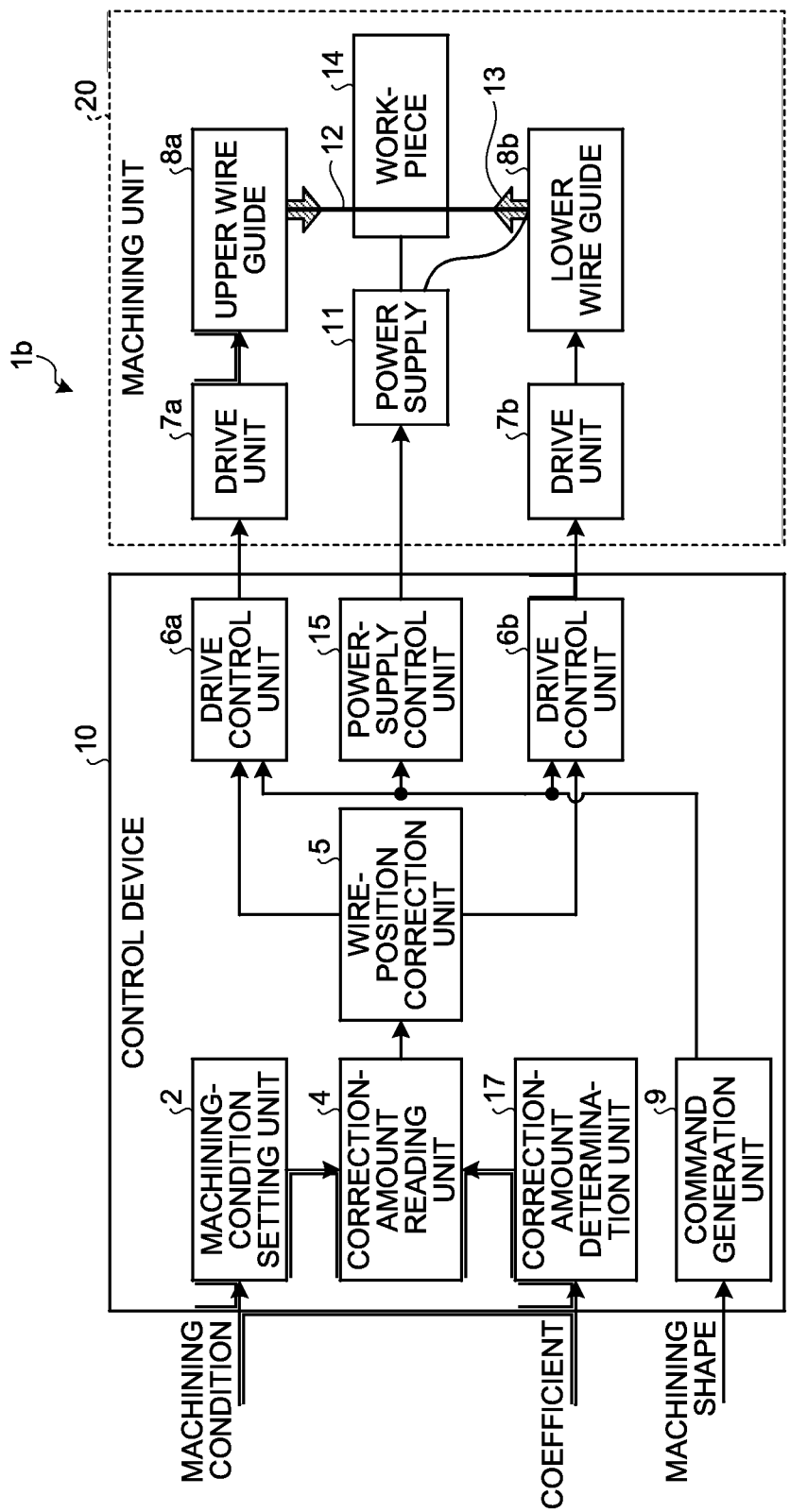
FIG. 13 depicts a configuration of a wire electric discharge machining apparatus according to a sixth embodiment.

A ninth embodiment of the present invention is explained next with reference to FIG. 13. While the case where the wire-position correction amounts are stored using a numerical table (a tabular form) as shown in FIG. 8-2 is explained in the fifth embodiment, the wire-position correction amounts are generated by a correction-amount determination unit 17 using a function represented by the following expression (1), instead of the correction-amount storage unit 3, in the present embodiment. A wire electric discharge machining apparatus 1b shown in FIG. 13 has the same configuration as that according to the first embodiment shown in FIG. 1 except that the correction-amount storage unit 3 is replaced by the correction-amount determination unit 17, and thus explanations of other components will be omitted. Coefficients are input to the correction-amount determination unit 17.

$$\Delta Y = f(T, P) \tag{1}$$

In this expression, $\Delta Y$ denotes the wire-position correction amount, f( ) denotes a function, T denotes the wire tension, and P denotes the machining fluid pressure. While only a correction value in the Y-axis direction is shown in the expression (1), the same holds true for the X-axis direction. Specifically, the expression (1) is represented by the following expression (2).

$$\Delta Y = (a \times T) + (b \times P) + c \tag{2}$$

In this expression, a, b, and c are coefficients and are identified from measurement results of the machining shape. When the upper side distanced Da or the lower side distance Db as the distance between the nozzle 30a or 30b and the workpiece 14 is considered, the expression (1) becomes the following expression (3). In the expression (3), the upper side distance Da and the lower side distance Db are denoted by L.

$$\Delta Y = g(T, P, L) \tag{3}$$

Specifically, the expression (3) can be approximated by the following expression (4).

$$\Delta Y = (a \times T) + (d \times P/L) + e \tag{4}$$

In the expression (4), d and e are coefficients and are identified from measurement results of the machining shape.

As described above, according to the ninth embodiment, the wire-position correction amounts are determined by the correction-amount determination unit 17 based on the measurement results of the machining shape of the workpiece 14 machined on various machining conditions or the position of the wire electrode 13 during machining. Therefore, the wire-position correction amounts on machining conditions that are not measured can be easily and accurately determined from the wire-position correction amounts on measured machining conditions. Accordingly, the wire-position correction amounts with necessary accuracy can be determined with fewer measurement times. Furthermore, a memory amount required for the control device of the electric discharge machining apparatus can be reduced.

INDUSTRIAL APPLICABILITY

As described above, the wire electric discharge machining apparatus and the control device according to the present invention are suitable for wire electric discharge machining while correcting displacement in the position of a wire electrode.

REFERENCE SIGNS LIST

1a, 1b wire electric discharge machining apparatus, 2 machining-condition setting unit, 3 correction-amount storage unit, 4 correction-amount reading unit, 5 wire-position correction unit, 6a, 6b drive control unit, 7a, 7b drive unit, 8a upper wire guide, 8b lower wire guide, 9 command generation unit, 10 control device, 11 power supply, 12 wire electrode, 13 machining fluid, 14 workpiece, 15 power-supply control unit, 16a to 16c position meter, 17 correction-amount determination unit, 20 machining unit, 30a, 30b nozzle, actual measurement point, 62 interpolation point.

The invention claimed is:

1. A wire electric discharge machining apparatus comprising:
a first wire guide that supports a wire electrode at a first position and delivers the wire electrode to a side of a workpiece;
a second wire guide that supports the wire electrode at a second position opposing the first position and rewinds the wire electrode delivered from the side of the workpiece;
a first drive unit that changes a relative position between the wire electrode and the workpiece by moving a position of the first wire guide;
a second drive unit that changes a relative position between the wire electrode and the workpiece by moving a position of the second wire guide;
a first drive control unit that controls the first drive unit based on a machining shape of a portion of the workpiece to be machined;
a second drive control unit that controls the second drive unit based on the machining shape;
a machining-condition setting unit that sets a machining condition including a tension of the wire electrode extended between the first wire guide and the second wire guide;
a correction-amount storage unit that previously stores therein a position correction amount for the wire electrode corresponding to the machining condition;
a correction-amount reading unit that reads the position correction amount for the wire electrode corresponding to the machining condition from the correction-amount storage unit; and
a wire-position correction unit that causes the first and second drive control units to correct a relative distance between the wire electrode and the workpiece based on the position correction amount.

2. The wire electric discharge machining apparatus according to claim 1, wherein:
the fir wire guide includes a first nozzle that supplies a machining fluid to the workpiece;
the second wire guide includes a second nozzle that supplies a machining fluid to the workpiece; and the machining condition further includes a pressure of the machining fluid supplied from the first nozzle and a pressure of the machining fluid supplied from the second nozzle.

3. The wire electric discharge machining apparatus according to claim 2, wherein the machining condition further includes a distance between the workpiece and the first nozzle and a distance between the workpiece and the second nozzle.

4. The wire electric discharge machining apparatus according to claim 2, wherein the machining condition further includes a stiffness of the wire electrode, a diameter of the wire electrode, and a distance between the first wire guide and the second wire guide.

5. The wire electric discharge machining apparatus according to claim 2, wherein the machining condition further includes a stiffness of the workpiece and a shape of the workpiece.

6. The wire electric discharge machining apparatus according to claim 1, wherein the position correction amount is determined by measuring a post-machining shape of the workpiece machined based on plural kinds of machining conditions.

7. The wire electric discharge machining apparatus according to claim 1, wherein the position correction amount is determined based on displacement amounts of the first and second wire guides measured during machining based on plural kinds of machining conditions.

8. The wire electric discharge machining apparatus according to claim 5, wherein the position correction amount is determined using a displacement amount of the workpiece measured during machining based on plural kinds of machining conditions.

9. A control device comprising:
a first drive control unit that controls a first drive unit based on a machining shape of a portion of a workpiece to be machined, the first drive unit changing a relative position between a wire electrode and the workpiece by moving a position of a first wire guide that supports the wire electrode at a first position and delivers the wire electrode on a side of the workpiece;
a second drive control unit that controls a second drive unit based on the machining shape, the second drive unit changing a relative position between the wire electrode and the workpiece by moving a position of a second wire guide that supports the wire electrode at a second position opposing the first position and rewinds the wire electrode delivered from the side of the workpiece;
a machining-condition setting unit that sets a machining condition including a tension of the wire electrode extended between the first wire guide and the second wire guide;
a correction-amount storage unit that previously stores therein a position correction amount for the wire electrode corresponding to the machining condition;
a correction-amount reading unit that reads the position correction amount for the wire electrode corresponding to the machining condition from the correction-amount storage unit; and
a wire-position correction unit that causes the first and second drive control units to correct a relative distance between the wire electrode and the workpiece based on the position correction amount.

* * * * *